United States Patent [19]

Hisazumi et al.

[11] Patent Number: 4,992,311
[45] Date of Patent: Feb. 12, 1991

[54] RESIN COMPOSITION AND MOLDED PRODUCTS THEREOF

[75] Inventors: Nobuyuki Hisazumi; Tsutomu Uehara, both of Tsuchiura; Hiroyuki Ohba, Niihari; Kazuhiko Hirose, Abiko, all of Japan

[73] Assignee: Kureha Kagaku Kogyo Kabushiki Kaisha, Tokyo, Japan

[21] Appl. No.: 332,823

[22] Filed: Apr. 4, 1989

[30] Foreign Application Priority Data

Apr. 8, 1988 [JP] Japan .................................. 63-86673
Apr. 3, 1989 [EP] European Pat. Off. ......... 89303272.2

[51] Int. Cl.$^5$ ........................ B32B 27/30; B32B 27/34
[52] U.S. Cl. .................................. 428/35.4; 428/36.6; 428/475.5; 525/178
[58] Field of Search ............... 525/178; 428/35.4, 36.6, 428/36.7, 475.5, 475.8

[56] References Cited

U.S. PATENT DOCUMENTS

| | | | |
|---|---|---|---|
| 4,399,839 | 8/1983 | Hutschenreuter et al. | 138/118.1 |
| 4,468,427 | 8/1984 | Degrassi et al. | 428/475.8 |
| 4,525,414 | 6/1985 | Ohya et al. | 428/213 |
| 4,551,366 | 11/1985 | Maruhashi et al. | 428/34.2 |
| 4,578,294 | 3/1986 | Ouchi et al. | 428/476.3 |
| 4,647,509 | 3/1987 | Wallace et al. | 428/476.1 |
| 4,732,745 | 3/1988 | Ohya et al. | 428/213 |
| 4,755,402 | 7/1988 | Oberle | 428/475.5 |
| 4,764,406 | 8/1988 | Hisazumi et al. | 428/35 |
| 4,786,513 | 11/1988 | Monforton et al. | 426/115 |
| 4,851,245 | 7/1989 | Hisazumi et al. | 426/105 |
| 4,892,765 | 1/1990 | Hisazumi et al. | 428/34.8 |

FOREIGN PATENT DOCUMENTS

73340/87  12/1987  Australia .
1397472   6/1975  United Kingdom .

OTHER PUBLICATIONS

*Chemical Abstracts,* vol. 104, No. 15, Apr. 14, 1986, Kusumi et al, p. 597, col. 2, A bstract No. 128 645x.
*Chemical Abstracts,* vol. 111, No. 9, Aug. 28, 1989, Nishino et al., p. 642, col. 1, Abstract No. 76 743a.
*Chemical Abstracts,* vol. 111, No. 9, Aug. 28, 1989, Nishino et al, p. 642, col. 1, Abstract No. 76 740x.
*Chemical Abstracts,* vol. 108, No. 18, May 2, 1988, Kusumi et al, p. 62, col. 1, Abstract No. 151 839e.

*Primary Examiner*—James Seidleck
*Attorney, Agent, or Firm*—Nixon & Vanderhye

[57] ABSTRACT

Disclosed herein are a resin composition comprising 5 to 95% by weight of a vinylidene chloride resin and 5 to 95% by weight of a polyamide resin having a low crystalline melting point of not higher than 210° C and a molded product of said resin composition.

The molded product of the present invention shows a molded product excellent in gas-barrier property and impact strength at low temperature, particularly a film, sheet or container.

Among the resin compositions of the present invention, since the composition having 60 to 95% by weight of vinylidene chloride resin is particularly rich in gas-barrier property, it is suitable for packaging foods, and since the composition having more than 40% by weight and not more than 95% by weight of polyamide resin is excellent particularly in impact strength at low temperature, it is suitable as the packaging material for use at an extremely low temperature. Moreover, the gas-barrier property and the transparency of the latter molded product which is rich in polyamide resin can be improved by stretching the product so that the dispersed particle of vinylidene chloride resin is made to be flat.

5 Claims, No Drawings

RESIN COMPOSITION AND MOLDED PRODUCTS THEREOF

BACKGROUND OF THE INVENTION

The present invention relates to a resin composition consisting of 5 to 95% by weight of vinylidene chloride resin (hereinafter referred to as PVDC) and 5 to 95% by weight of a polyamide resin of low melting temperature with a crystalline melting point of not higher than 210° C and to a molded product excellent in gas-barrier property and impact strength at low temperature comprising the above-mentioned composition.

PVDC is a resin which has excellent gas-barrier property and can be processed into films or bottles excellent in heat-sealing property, heat shrinkability and transparency, and is suitable for food-packaging. However, in the case of using PVDC only, the impact strength thereof at low temperature is small, and accordingly, several methods have been proposed for improving the mechanical strength of PVDC at low temperature.

For instance, a method of combining a liquid plasticizer with PVDC or a method of laminating PVDC and polyolefin, etc. has been carried out. However, the addition of a large amount of the liquid plasticizer makes the gas-barrier property poor and there is a possibility of permeating of the liquid plasticizer to the foods, and for producing the laminated molded products, it is necessary to provide a plurality of extrudes and the operation becomes complicated.

In order to reduce the amount used of the plasticizer, there is a technique of blending a chlorinated polymer with PVDC [refer to Japanese patent applications Laid-Open Nos. 53-58553 (1978), 53-136054 (1978) and 54-74848 (1979)]. Although the above-mentioned technique can prevent the deterioration of the gas-barrier property, the improvement of the impact strength at low temperature is not sufficient.

Moreover, the improvement of the impact strength of PVDC at low temperature is carried out by mixing a small amount of rubbery or elastic substance with PVDC [refer to Japanese Patent Publication No. 40-16141 (1965)]. However, there are cases where the molded product obtained by this method can not fulfill the impact strength at low temperature and the oxygen-barrier property at the same time.

On the other hand, polyamide resin is industrially utilized in the field of the melt-extruding molded products because of the excellent toughness, heat-resistance, cold-resistance, oil-resistance, transparency, etc. thereof, as the resin for single film, sheet or the resin for forming a layer of making laminated products (EPO139,888, GB2,035,198). However, since polyamide resin shows a large oxygen-Permeability coefficient and water vapor transmission rate at a high humidity, the range of utilization of polyamide resin has been limited.

Since polyamide resin is a structurally hydrophilic resin, it absorbs moisture in the atmosphere of high humidity, and it is plasticized by the thus absorbed water molecules resulting in the deterioration of the barrier property to oxygen, water, etc.

In the case where there is a moisture-dependency of the barrier property, not only the humidity of the outside atmosphere but also the water content of the packaged product itself must be considered, and accordingly, in the case of packaging the material containing a large amount of water, the gas-barrier property of polyamide resin becomes insufficient.

In general, to reduce the oxygen-permeability coefficient of polyamide resin, there is a method of mixing a saponified product of ethylene-vinylacetate copolymer [refer to Japanese patent application Laid-Open No. 62-7761 (1987)].

However, the oxygen-permeability under high moisture is still large, and there are problems of the occurrence of cross-linked gels at the time of melt-extruding, etc.

It has been desired to improve the hitherto-known defects of polyamide resin, namely (1) poor oxygen-barrier property under the atmosphere of high humidity and (2) large water vapor transmission rate under the atmosphere of high humidity, together with the problems of inability of maintaining the moldability, the gas-barrier property and the impact strength at low temperature in the case of mixing the polyamide with another resin for dissolving the above-mentioned defects, to a practically sufficient level at the same time.

As mentioned above, although PVDC and polyamide resin are respectively excellent resins, each of them has its own defects and a resin provided with both a practical gas-barrier property and an excellent impact strength at low temperature has been desired particularly in the field of food-packaging materials.

In order to solve the above-mentioned problem, a method of laminating a layer of PVDC and a layer of polyamide resin has been proposed [U.S. Pat. No. 4,112,182 and Japanese patent application Laid-Open No. 62-273849 (1987)]. However, since the adhesive power of each other of them is not sufficient, it is necessary to use a special adhesive and using a plurality of extrudes has a weak point of complicated operation.

As a result of the present inventors' earnest studies for obtaining a resin composition excellent in gas-barrier property and impact strength at low temperature and well balanced, they have found that a resin composition obtained by mixing PVDC and a polyamide resin having a crystalline melting point of not higher than 210° C has an excellent impact strength at low temperature and practical gas-barrier property, and on the basis of this finding, the present inventors have completed the present invention.

Further, the gas-barrier property in the present invention means the barrier property to oxygen and water vapour.

SUMMARY OF THE INVENTION

The object of the present invention lies in offering a resin composition comprising 5 to 95% by weight of PVDC and 5 to 95% by weight of a polyamide resin having the crystalline melting point of not higher than 210° C and having a practically excellent gas-barrier property and an impact strength at low temperature, and a molded product comprising the resin composition, particularly films, sheets or containers.

Further, the object of the present invention lies in offering a resin composition comprising 60 to 95% by weight of PVDC and 40-5% by weight of a polyamide resin having low melting point of the crystalline melting point of not higher than 210° C and a molded product of the above-mentioned resin composition, particularly films, sheets or containers.

Moreover, the object of the present invention lies in offering a resin composition comprising more than 40% by weight and not more than 95% by weight of a polyamide resin having a low crystalline melting point of not higher than 210° C and less than 60% by weight and not less than 5% by weight of PVDC, and a molded products comprising the above-mentioned composition, particularly film, sheet or container.

Still more, the object of the present invention lies in offering a stretch-molded product, particularly stretched film, sheet or container, which product has at least one layer comprising a resin composition comprising more than 40% by weight and not more than 95% by weight of a polyamide resin having a low crystalline melting point of not higher than 210° C and less than 60% by weight and not less than 5% by weight of PVDC, the dispersed particles of PVDC resin in the above-mentioned layer showing a long and flat shape along at least one of the stretched direction and the flatness of the cross section of the dispersed particle (long axis of the cross-section of the dispersed particle/short axis of the cross-section of the dispersed particle) being more than 2.

Further more, the object of the present invention lies in offering a stretch-molded product showing the oxygenpermeability coefficient at 30° C and 100% RH of not more than $1.5 \times 10^{-11}$cc cm/cm$^2$.sec.cmHg or the haze of the molded product of 30 $\mu$m in thickness being not more than 40%.

DETAILED DESCRIPTION OF THE INVENTION

The resin composition of the present invention comprises 5 to 95% by weight of PVDC and 5 to 95% by weight of a polyamide resin having a low crystalline melting point of not higher than 210° C.

As PVDC used in the present invention, a copolymer mainly comprising vinylidene chloride, preferably a copolymer of 65 to 98% by weight of vinylidene chloride with 2 to 35% by weight of at least one monomer copolymerizable with vinylidene chloride is used. As the monomer copolymerizable with vinylidene chloride, for instance, a monomer selected from the group consisting of vinyl chloride, acrylonitrile, alkyl acrylate (carbon number in the alkyl group being 1 to 18) alkyl methacrylate (carbon number in the alkyl group being 1 to 18), acrylic acid, methacrylic acid, etc. is preferable. In the case where the amount of vinylidene chloride is less than 65% by weight, the copolymer becomes rubbery at normal temperature and is poor in gas-barrier property. On the other hand, in the case where the amount of vinylidene chloride is more than 98% by weight, the melting point of the copolymer becomes high and the copolymer is apt to decompose thermally and the stable melt-extruding becomes difficult.

As the polyamide resin mixed with PVDC, a polyamide resin having a low crystalline melting point of not higher than 210° C, preferably not higher than 200° C, and more preferably not higher than 190° C is used. The crystalline melting point of the polyamide resin in the present invention is shown by the temperature showing the maximum value on the melting curve obtained when 8 to 10 mg of the resin is heated at a temperature-raising speed of 20° C/min while using a differential scanning calorimeter (made by Mettler Co. model TA-3000).

Further, as the polyamide resin, a polyamide resin having a low glass transition temperature (Tg) of preferably not higher than 55° C, more preferably not higher than 47° C is used.

The glass transition temperature of the polyamide resin is determined while following DIN 53445 and using a Torsion Pendurum Analyzer (made by RHESCA Co. model TPA-10).

A sheet obtained by cooling gradually a press sheet of each polyamide resin and crystallizing is used as the sample.

As the polyamide resin of a low melting point, for instance, aliphatic polyamide of $C_4$ to $C_{12}$, alicyclic polyamide and aromatic polyamide, or a mixture thereof is used.

As the monomer constituting the polyamide resin, for instance, a straight chain $\omega$-aminocarboxylic acid of carbon number of $C_6$ to $C_{12}$, the lactam thereof, adipic acid, sebacic acid, dodecanedicarboxylic acid, heptadecanedicarboxylic acid, hexamethylenediamine, isophthalic acid, bis-(4-aminocyclohexyl)-methane, 2,2-bis-(4'-aminocyclohexyl)-propane, telephthalic acid or dimethyl ester thereof, 1,6-diamino-2,4,4-trimethylhexane, 1,6-diamino-2,4,4-trimethylhexane, 1-amino-3-amino-methyl-3,5,5-trimethylcyclohexane, etc. are preferable, and the polymer and copolymer formed from the above-mentioned monomer is used. Among these products, nylon 6-66, nylon 6-69, nylon 6-11, nylon 11, nylon 12, nylon 6-12, nylon 6-66-610, nylon 6-66-610-612, etc. is suitable.

In the case where the content of PVDC in the resin composition of the present invention is not more than 5% by weight, the oxygen-permeability coefficient, water vapour transmission rate becomes large resulting in the poor gas-barrier property and it becomes difficult to preserve the food stuff packaged for the long time. On the other hand, in the case where the content of PVDC is more than 95% by weight, the impact strength at low temperature becomes poor, and cracks are formed in the bag made from the film during the preservation at cooling (not higher than 5° C) and at refrigerating (not higher than 0° C) resulting in unsuitableness for practical use.

In the resin composition of the present invention, there is a merit that even PVDC, which contains 90 to 98% by weight of vinylidene chloride and is excellent in gas-barrier property but is difficult to melt-extrude and stretch singly in general, can be easily melt extruded and stretched into the stretched and molded product by mixing with a large amount of the polyamide resin.

Into the resin composition of the present invention, a polyolefin such as polyethylene, polypropyrene, an ethylene-acrylic acid copolymer, an ethylene-vinylacetate copolymer, an ethylene-ethyl acrylate copolymer, etc., a modified polyolefin, such as graft product of polyolefin with maleic acid, a thermoplastic resin such as ionomer, etc., elastomer and inorganic and organic adjuvant such as inorganic fillers, pigments can be added in the range of not impede the object and the effect of the present invention.

Moreover, if necessary, a small amount of a plasticizer, a stabilizer, a lubricant, an antioxidant, and a pigment can be added to the resin composition.

The mixed composition of PVDC and a polyamide resin of the present invention is melt-molded into films, containers (bottles), sheets, etc. The film may be stretched and not stretched. The molded product may be the product containing at least one layer comprising the thus formed composition, and it is possible to laminate the layer with the other resin layers in the range of not impede the object of the present invention. As the resin for forming the other resin layer, polyolefin such as polyethylene, polypropylene, ethylene-propylene copolymer, ethylene-vinylacetate copolymer, ethylene-acrylic acid copolymer, ethylene-ethylacrylate copolymer etc. Ionomer, polyester such as polyethyleneterephthalate, polybutyleneterephthalate etc., polyamide, polycarbonate, polyvinylalcohol, saponified ethylene-vinylacetate copolymer, cellophane etc. may be mentioned.

In the case of a single layer, the blended composition of polyamide resin and PVDC is melt-extruded from an extruder while following the conventional method and can be molded into a shape of sheet, film or container by T-die molding, blow-molding, inflation molding, etc. In the case of multiple layers, resins are extruded while using a plurality of extrudes and are molded using a die for multi-layers. More over, to the sheet, film or container having a layer comprising the composition of polyamide resin and PVDC, a sheet or film comprising the other resin may be laminated.

The thus obtained molded product has an excellent impact strength at low temperature and a practical gas-barrier property under a high humidity.

As the oxygen-permeability coefficient, it is preferable that the coefficient is not more than $2.0 \times 10^{-11}$ cc.cm/cm$^2$.sec.cmHg at 30° C and 100% RH, and as the water vapour transmission rate is preferably not more than 150 g/m$^2$.day at 40° C. and 90% RH.

In the present invention, the impact strength at low temperature is evaluated by determinating the brittle temperature of the film (Tb of the film). As the Tb value of the film, the value of not higher than 10° C is practicable and preferable.

The brittle temperature of the film was determined by a machine for determining the brittle temperature of a film (made by SANKO RIKA Co., Ltd. ESAKA-style). By the composition of the present invention, it is easy to obtain a molded product having an excellent impact strength at low temperature of the Tb value of not higher than 10° C, and cracks are not formed in the bag made from the molded product, for instance, film even at a low temperature.

As a desirable and concrete example of the resin composition according to the present invention, a resin composition (I) comprising 60 to 95% by weight, preferably 65 to 90% by weight and more preferably 65 to 85% by weight of PVDC and 40 to 5% by weight, preferably 10 to 35% by weight and more preferably 15 to 35% by weight of a polyamide of low melting point, a resin composition (II) comprising more than 40% by weight and not more than 95% by weight, preferably 45 to 90% by weight and more preferably 50 to 85% by weight of a polyamide resin of low melting temperature of not higher than 210° C and less than 60% by weight and not less than 5% by weight, preferably 10 to 55% by weight and more preferably 15 to 50% by weight and more preferably 15 to 50% by weight of PVDC can be mentioned.

The composition (I) is molded into a molded product, preferably into sheets, films or containers. Since the molded product comprises not less than 60% by weight of PVDC, the product is particularly low in the oxygen-permeability coefficient and the water vapor transmission rate, and accordingly, it is suitable to use as the packaging material for the foods extremely sensitive to oxygen. The oxygen permeability coefficient is preferably not more than $1.5 \times 10^{-11}$ cc.cm/cm$^2$.sec.cmHg and more preferably not more than $1.0 \times 10^{-11}$ cc.cm/cm$^2$.sec.cmHg. Further, the water vapor transmission rate is not more than 80 g/m$^2$.day, preferably not more than 75 g/m$^2$.day and particularly not more than 70 g/m$^2$.day.

Also the composition (II) is molded into the molded products, preferably sheets, films or containers. Since the molded product contains more than 40% by weight of polyamide resin, it is extremely excellent in the impact strength at low temperature, and the rate of occurrence of cracks is very small in the handling even at an extremely low temperature. The impact strength at low temperature of the molded product comprising the composition (II) is preferably not higher than 10° C, more preferably not higher than 5° C., still more preferably not higher than 0° C as the Tb value of the film.

Moreover, the molded product, preferably film and sheet, is stretched to make the dispersed particles of PVDC show the long and flat shape along one of the stretched direction in the layer comprising polyamide resin and PVDC, and to make the flatness of the cross section (long axis of the cross section of the dispersed particle/short axis of the cross section of the dispersed particle) not less than 2. Although the stretching ratio may be appropriate in the case where the above-mentioned conditions are fulfilled, preferably the molded product is stretched not less than 4 times in the area-stretching ratio, and more preferably not less than 6 times in the area-stretching ratio. The ratio of the stretching in the lengthwise direction to the stretching in the breadthwise direction is not particularly limited, and the molded product may be stretched monoaxially or biaxially.

The area-stretching ratio means the lengthwise ratio of stretching multiplied by the breadthwise ratio of stretching. By carrying out the above-mentioned stretching operation, the oxygen-permeability coefficient at 30° C and 100% RH becomes not more than ¾ as compared to the case of non-stretching, and the haze becomes not more than ¾ as compared to the case of non-stretching in the same thickness of the product. Although good result is obtained in the case where the areastretching rate is not less than 4, it is preferable that the stretching ratio in the lengthwise direction is nearly the same to the stretching ratio in the breadthwise direction.

The reason why the oxygen-permeability coefficient becomes very small by carrying out the stretching treatment on the layer of the resin composition(II) has not been elucidated, however, it is considered that the shape of the dispersed particle is concerned to the above-mentioned property.

In general, the physical property of a polymer blend depends largely on the size, the shape, the mode of arrangement, etc. of the dispersed particles. For instance, the gas-permeability coefficient is smaller in the case where the polymer, which becomes the barrier material, is dispersed as a flat shape such as disk or thin piece in the other resin and the long axis thereof is arranged in parallel to the surface direction of the film, sheet or container than in the case where the polymer, which becomes the barrier material, is dispersed in spherical shape.

In this case, the flatness of the dispersed particle is important. In the case where the flatness of the dispersed particle is defined as the long axis of the cross section of the dispersed particle divided by the short axis of the cross section of the dispersed particle, the effect of reducing the permeability coefficient is small in the case where the flatness is small, however, the effect of reducing the permeability coefficient is very large in the case where the flatness is large.

In the layer comprising the resin composition(II), PVDC has the faculty as the barrier material, and when the stretching is carried out for making the flatness of the cross section of the dispersed particle of PVDC large, the barrier property to oxygen gas is improved. Particularly, by carrying out the stretching so as to make the flatness not less than 2, the barrier property to oxygen gas is remarkably improved even in the case where the amount of PVDC is small. The practically sufficient level of the barrier property to oxygen gas is the oxygen-permeability coefficient of not more than $2.0\times10^{-11}$ cc.cm/cm$^2$.sec.cmHg, preferably not more than $1.5\times10^{-11}$ cc.cm/cm$^2$.sec.cmHg at 30° C and 100% RH.

Moreover, the reason why the transparency of the product is much improved by carrying out the stretching operation on the layer of the mixture of the present invention has not been elucidated sufficiently, however, it is considered that the shape of the dispersed particle is concerned largely. Namely, it is considered that the mode of scattering of the light is related to the shape of the dispersed particle. Particularly, in the case where the flatness of the dispersed particle is not less than 2, a remarkable effect appears and the product showing the haze of not more than 40% at 30 μm of the thickness of the molded product can be easily obtained.

In the present invention, stretching process is carried out by any publicly known method at cooled state or hot state while utilizing the plastic deformation of the resin, and the process includes draw-molding, blow molding, vacuum molding pressured molding, sheet-blow molding, compression molding, etc. Moreover, even in the case of stretching in the flow state, the stretching which can make the dispersed particle flat is able to obtain the same effect.

Moreover, a pouch-like container can be prepared by sticking the peripheral parts of the sheet or film of the present invention together. For the sticking, an adhesive of epoxy series or isocyanate series may be used, and further, the heat-sealing and high frequency-sealing can be used in the sticking.

Since the composition of the present invention is a resin composition of 5 to 95% by weight of PVDC and 5 to 95% by weight of a polyamide resin having a low crystalline melting temperature of not higher than 210° C, it can be formed into a molded product showing a practical gas-barrier property and an excellent impact strength at low temperature. The thus formed molded product has the well balanced properties of, for instance, the oxygen permeability coefficient of not more than $2.0\times10^{-11}$ cc.cm/cm$^2$.sec.cmHg under the conditions of 30° C and 100% RH, the water vapor transmission rate of not more than 150 g/m$^2$.day under the conditions of 40° C and 90% RH, and the impact strength at low temperature of not higher than 10° C of the Tb value of the film, and it is suitable in the field of food packaging as the sheet, film, bottle, etc. For instance, composition of the present invention is suitable as the packaging material for packaging ham, sausage, processed meat, drinks such as juice and cider.

Since these foods and drinks are turned into cooled state or chilled state in the time of production, marketing and preservation, the impact strength at low temperature is necessary, however, since the molded product of the present invention has a practical impact strength at low temperature, the rate of the cracks in the product is little, and the yield and the processability are improved.

Of the above-mentioned compositions, the composition (I), which is rich in PVDC, is particularly excellent in gas-barrier property and is suitable for packaging the foods which are extremely sensitive to oxygen. On the other hand, the composition (II), which is rich in polyamide resin, is particularly excellent in the impact strength at low temperature, and accordingly, it is suitable as the packaging material used at an extremely low temperature.

Moreover, the stretched molded product, which has been obtained from the composition (II) and has been stretched so that the dispersed particle of PVDC becomes flat in shape, has the gas-barrier property and the transparency which are extremely improved as compared to non-stretched product. Through the thus molded product, the content can be seen. Such a property improves the commercial value, and the use as the packaging material is enlarged.

EXAMPLES

The present invention will be explained more in detail by the following examples, however, the present invention is not limited to the following examples.

The methods for determining each of the properties of the molded products are as follows:

Oxygen-permeability coefficient

Oxygen-permeability coefficient was determined while following ASTM D 3985-81 and using MOCON OXTRAN-100 made by Modern Control Co. under the conditions of 30° C and 100% RH.

Crystalline melting point

The crystalline melting point of polyamide resin was determined while following ASTM D 3418 and using DSC TA3000 made by Mettler Co.

Water vapor transmission rate.

Water vapor transmission rate of a film of 30 μm in thickness was determined by the method described in Japanese Industrial Standards (JIS) Z 0208. It is preferable that the value is not more than 150 g/m$^2$.day.

Haze

Haze of the molded product was determined while following ASTM 1003 and using the Σ80 Color Measuring System (made by Nippon Denshoku Kogyo Co. Ltd.) and the value calculated to the thickness of 30 μm was shown.

Brittle temperature of the film

Brittle temperature of the film was determined by the method of Kureha Kagaku Co., Ltd. An impact was given to the film specimen by a cylindrical punch of 3 mm in diameter having a hemispherical head of 1.5 mm in radius at a speed of 1 m/sec at the determination temperature (room temperature to −30° C), and the occurrence of breakage was observed.

Since the phenomenon accompanying breakage has a large fluctuation, in order to obtain the brittle temperature more accurately, the number of determination at one temperature condition was made 20, and the determination was carried out between the temperature at which 20 specimens were not broken and the temperature at which all 20 specimens were broken at an interval of 5° C. When the total number of breakage rate (%) at each temperature was S, the brittle temperature of film was calculated by the following formula:

$$Tb = Th + \Delta T[(S/100) - (\tfrac{1}{2})]$$

where
- Tb is the brittle temperature (° C) of film
- Th is the highest temperature at which all 20 specimen was broken (°C)
- ΔT is the interval of temperature (5° C) and
- S is the total sum of the rate of breakage from the lowest temperature at which all 20 specimen were not broken to the Th.

Method of determination of the flatness of the dispersed particle

Ultrathin section of a sheet, film or container were prepared so that the cross section of the specimen was observed, and the sections were photographed by a electronmicroscope (made by Nippon Denshi Co., Ltd., the model of 100CX). The flatness of the dispersed particle was obtained by the following formula:

$$A = \frac{B}{C}$$

wherein A is the flatness of the cross section of the dispersed particle, B is the long axis of the cross section of the dispersed particle and C is the short axis of the cross section of the dispersed particle.

Herein, the long axis of the cross section of the dispersed particle is the length of the sheet, film and container along the longest stretch direction, and the short axis of the cross section of the dispersed particle is the thickness of the dispersed particle which is the most thick part. The long axis of the cross section of the dispersed particle and the short axis of the cross section of the dispersed particle are the mean value of 20 pieces of the dispersed particles.

EXAMPLES 1 TO 3

A vinylidene chloride-vinyl chloride copolymer (Content of vinylidene chloride is 70% by weight) and 6-66-610 nylon copolymer resin having a crystalline melting point of 153° C and a glass transition temperature of 32° C (made by TORAY Co. Amilan CM-4000) as the polyamide resin were mixed in the ratio of 10, 20 and 30% by weight respectively, and the mixed resin was melt-extruded from an extruder provided with a circular die at the resin temperature of 170° C and was rapidly chilled by water at 15° C. The thus obtained tubular parison was heated by a heating rool at 50° C, air is blown into the parison immediately to inflation-stretch the parison at the ratio of lengthwise direction (MD) /breadthwise direction (TD)=2.5/2.5, thereby obtaining a stretched film of 30 μm in thickness.

The oxygen-permeability coefficient, water vapor transmission rate and the brittle temperature of the film as the impact strength at low temperature were determined and the results were shown in Table 1. It is understood that the stretched film consisting of a mixed resin composition of PVDC and polyamide resin of low melting temperature according to the present invention is provided with an excellent oxygen-permeability coefficient, water vapor transmission rate and a low brittle temperature at the same time.

COMPARATIVE EXAMPLES 1 AND 2

Each resin of the resins used in Examples 1 to 3 was processed in the same method to obtain each inflation-stretched film.

The oxygen-permeability coefficient, water vapor transmission rate and the brittle temperature of the thus prepared film were shown in Table 1.

EXAMPLES 4 TO 6

Into a vinylidene chloride-methyl acrylate copolymer (Content of vinylidene chloride of 95% by weight), 6-66-610 nylon copolymer resin (made by TORAY Co., Amilan CM-4000) was mixed as a polyamide resin in the ratio of 10, 20 and 30% by weight respectively, the thus obtained mixture was processed into the stretched film by the same method as in Examples 1 to 3.

The oxygen-permeability coefficient, water vapor transmission rate and the brittle temperature of the thus obtained film were determined and the results were shown in Table 1.

EXAMPLES 7 TO 9 and COMPARATIVE EXAMPLES 3 TO 4

Into a vinylidene chloride-vinyl chloride copolymer (Content of vinylidene chloride of 70% by weight), Grilon CF6S (made by EMS CHEM AG Co.) which is 6-12 -nylon (copolymer of nylon 6 and nylon 12, ratio of copolymerization of 50/50 by weight) having a crystalline melting point of 130° C and a glass transition temperature of 30° C (hereinafter referred to as 6-12 nylon-1) and Grilon XE 3116 (made by EMS Co.) which is 6-12-nylon having a crystalline melting point of 160° C and a glass transition temperature of 30° C (hereinafter referred to as 6-12-nylon-2) were respectively mixed in the ratio of 20% by weight. The stretched film was obtained from the thus prepared resin mixture by the same method as in Examples 1 to 3.

Moreover, on the mixed resin prepared by mixing a vinylidene chloride-vinyl chloride copolymer (Content of vinylidene chloride of 80% by weight) with 20% by weight of a polyamide resin (6-12-nylon-1), the same method as in Examples 1 to 3 was carried out to obtain the stretched film. On the other hand, 6-12-nylon-1 and 6-12-nylon-2 were processed respectively by the same method as in Examples 7 to 9 to obtain stretched film.

The properties of the above-mentioned film were shown in Table 1 collectively.

EXAMPLE 10

Into a vinylidene chloride-vinyl chloride copolymer (Content of vinylidene chloride of 80% by weight), 6-66-610 nylon copolymer resin (made by TORAY Co., Amilan CM 4000) was mixed in the ratio of 20% by weight as the polyamide resin. From the thus prepared resin mixture, stretched film was obtained by the same method as in Examples 1 to 3. The properties of the thus obtained film are shown in Table 1.

TABLE 1

| | PVDC (A) (ratio of copolymerization) | Polyamide resin (B) | Blending ratio (A/B) by weight | Oxygen-permeability coefficient cc · cm/cm² · sec · cmHg | Water vapor transmission rate g/m² · day | Brittle temperature °C |
|---|---|---|---|---|---|---|
| Exam. 1 | VD/VC (70/30) | 6-66-610 nylon | 90/10 | $1.3 \times 10^{-12}$ | 5.0 | 7 |
| Exam. 2 | VD/VC (70/30) | 6-66-610 nylon | 80/20 | $1.6 \times 10^{-12}$ | 5.7 | 5 |

TABLE 1-continued

| | PVDC (A) (ratio of copolymerization) | Polyamide resin (B) | Blending ratio (A/B) by weight | Oxygen-permeability coefficient cc · cm/cm$^2$ · sec · cmHg | Water vapor transmission rate g/m$^2$ · day | Brittle temperature °C |
|---|---|---|---|---|---|---|
| Exam. 3 | VD/VC (70/30) | 6-66-610 nylon | 70/30 | $2.0 \times 10^{-12}$ | 7.0 | 0 |
| Comp. Exam. 1 | VD/VC (70/30) | — | — | $1.1 \times 10^{-12}$ | 3.7 | 20 |
| Comp. Exam. 2 | — | 6-66-610 nylon | — | $1.8 \times 10^{-11}$ | 190 | $<-30$ |
| Exam. 4 | VD/MA (95/5) | 6-66-610 nylon | 90/10 | $1.2 \times 10^{-13}$ | 1.0 | 10 |
| Exam. 5 | VD/MA (95/5) | 6-66-610 nylon | 80/20 | $1.5 \times 10^{-13}$ | 1.3 | 7 |
| Exam. 6 | VD/MA (95/5) | 6-66-610 nylon | 70/30 | $1.8 \times 10^{-13}$ | 1.6 | 5 |
| Exam. 7 | VD/VC (70/30) | 6-12-nylon-1 | 80/20 | $1.5 \times 10^{-12}$ | 5.5 | 2 |
| Exam. 8 | VD/VC (70/30) | 6-12-nylon-2 | 80/20 | $1.4 \times 10^{-12}$ | 5.3 | 0 |
| Exam. 9 | VD/VC (80/20) | 6-12-nylon-1 | 80/20 | $1.3 \times 10^{-12}$ | 5.3 | 2 |
| Comp. Exam. 3 | — | 6-12-nylon-1 | — | $2.3 \times 10^{-11}$ | 200 | $<-30$ |
| Comp. Exam. 4 | — | 6-12-nylon-2 | — | $2.0 \times 10^{-11}$ | 210 | $<-30$ |
| Exam. 10 | VD/VC (80/20) | 6-66-610 nylon | 80/20 | $1.4 \times 10^{-11}$ | 6.0 | 5 |

EXAMPLES 11 TO 14

After dry-blending a 6-12-nylon-1 (Grilon CF6S) having a crystalline melting point of 130° C. with a vinylidene chloride-vinyl chloride copolymer (ratio of copolymerization of 80/20 by weight) in the weight ratio of 80/20, the thus obtained mixture was melt-kneaded in an extruder. The thus obtained kneaded mixture was melt-pressed while using a table press (made by Shinto Kinzoku Kogyosho Co., Ltd. model AYSR 5) at 175° C and then rapidly chilled by a cooling plate at 5° C to obtain a press sheet. The thus obtained press sheet was stretched by a biaxial stretching machine in a area-stretched ratio shown in Table 2. The stretch ratio was the same in the widthwise direction and the lengthwise direction.

The oxygen-permeability coefficient, water vapor transmission rate, haze, brittle temperature and the flatness of the dispersed particle of the thus obtained stretched film and non-stretched film were shown in Table 2.

In the case where the area-stretch ratio becomes larger than 4 times, the flatness of the dispersed particle becomes larger than 2, and the oxygen permeablilty coefficient at 30° C and 100% RH is improved than in the case of non-stretched film (Example 11) and becomes not more than ¼ as compared to the case of non-stretched film. The haze is improved and becomes not more than ¾ as compared to the case of non-stretched film.

EXAMPLES 15 TO 17

After dry-blending 6-12-nylon-1 (Grilon CF6S) as the polyamide resin and a vinylidene chloride-vinyl chloride copolymer (ratio of copolymerization of 80/20 by weight) as PVDC in a weight ratio of 60/40, the thus obtained mixture was processed into a press sheet by the same method as in Examples 11 to 14. The thus obtained press sheet was stretched at the area-stretch ratio shown in Table 2 while using a biaxial stretching machine. The stretch ratio was the same in the lengthwise direction and the breadthwise direction.

The properties of the non-stretched film and the stretched film are shown in Table 2.

EXAMPLE 18

After mixing the polyamide resin and PVDC both of which had been used in Examples 11 to 17 in the mixing ratio of 41/59 by weight, a press sheet was obtained by processing the thus prepared mixture in the same method as in Examples 11 to 17. The thus obtained press sheet was stretched to 14.8 times in the area stretch ratio by a biaxial stretching machine. The stretch ratio was the same in the widthwise direction and in the lengthwise direction. The properties of the thus obtained stretched film are shown in Table 2.

EXAMPLES 19 TO 23

By the same methods as in Examples 11 to 14, while using 6-12-nylon-1 (Grilon CF6S) as the polyamide and a vinylidene chloride-methyl acrylate copolymer (copolymerization ratio of 95/5 by weight) as PVDC in the mixing ratio of 90/10 by weight, a press sheet was obtained.

The thus obtained press sheet was stretched by a biaxial stretching machine to the area-stretch ratio shown in Table 2 at the same ratio of the widthwise direction and the lengthwise direction. The properties of the thus obtained non-stretched film and the stretched film are shown in Table 2 collectively.

COMPARATIVE EXAMPLES 5 TO 9

6-12-nylon-1 (Grilon CF6S) as the polyamide resin and a vinylidene chloride-vinyl chloride copolymer (Copolymerization ratio of 80/20 by weight) were respectively processed into a press sheet by the same methods in Examples 11-14. The thus obtained press sheet was stretched to the area-stretch ratio shown in Table 2 at the same ratio in the widthwise direction and the lengthwise direction. The properties of the thus obtained non-stretched film and the stretched film are shown in Table 2.

Although 6-12-nylon-1 is very excellent in the brittle temperature, it is insufficient in oxygen-permeability coefficient.

On the other hand, although VD/VC copolymer is excellent in oxygen-permeability coefficient, the brittle temperature thereof is high, and the impact strength at low temperature is insufficient.

Namely, it is understood that any one of the above-mentioned two kinds of film is too much unbalanced as the material for packaging. Moreover, the oxygen-permeability coefficient of each of the thus obtained films was hardly improved by stretching.

TABLE 2

| | PVDC (A) (ratio of copolymerization) | Polyamide resin (B) | Blending ratio (A/B) by weight | Area stretch ratio | Flatness of the dispersed particle | Oxygen-permeability coefficient cc·cm/cm²·sec·cmHg | Water vapor transmission rate g/m²·day | Haze % | Brittle temperature °C |
|---|---|---|---|---|---|---|---|---|---|
| Exam. 11 | VD/VC (80/20) | 6-12-nylon-1 | 20/80 | 1.0 | 1.0 | $1.6 \times 10^{-11}$ | 45 | 90 | $<-30$ |
| Exam. 12 | VD/VC (80/20) | 6-12-nylon-1 | 20/80 | 5.5 | 6.7 | $9.9 \times 10^{-12}$ | 36 | 30 | $<-30$ |
| Exam. 13 | VD/VC (80/20) | 6-12-nylon-1 | 20/80 | 8.5 | 8.0 | $7.2 \times 10^{-12}$ | 30 | 19 | $<-30$ |
| Exam. 14 | VD/VC (80/20) | 6-12-nylon-1 | 20/80 | 11.8 | 8.5 | $6.8 \times 10^{-12}$ | 29 | 11 | $<-30$ |
| Exam. 15 | VD/VC (80/20) | 6-12-nylon-1 | 40/60 | 1.0 | 1.0 | $1.3 \times 10^{-11}$ | 30 | 85 | $<-30$ |
| Exam. 16 | VD/VC (80/20) | 6-12-nylon-1 | 40/60 | 12.0 | 11.0 | $4.0 \times 10^{-12}$ | 12 | 30 | $<-30$ |
| Exam. 17 | VD/VC (80/20) | 6-12-nylon-1 | 40/60 | 15.0 | 13.5 | $3.7 \times 10^{-12}$ | 4 | 19 | $<-30$ |
| Exam. 18 | VD/VC (80/20) | 6-12-nylon-1 | 59/41 | 14.8 | 13.0 | $3.1 \times 10^{-12}$ | 8 | 23 | $<-20$ |
| Exam. 19 | VD/MA (95/5) | 6-12-nylon-1 | 10/90 | 1.0 | 1.0 | $1.8 \times 10^{-11}$ | 64 | 85 | $<-30$ |
| Exam. 20 | VD/MA (95/5) | 6-12-nylon-1 | 10/90 | 8.6 | 5.0 | $1.2 \times 10^{-11}$ | 37 | 26 | $<-30$ |
| Exam. 21 | VD/MA (95/5) | 6-12-nylon-1 | 10/90 | 11.2 | 7.0 | $1.1 \times 10^{-11}$ | 30 | 10 | $<-30$ |
| Exam. 22 | VD/MA (95/5) | 6-12-nylon-1 | 10/90 | 15.2 | 8.2 | $1.0 \times 10^{-11}$ | 27 | 3 | $<-30$ |
| Exam. 23 | VD/MA (95/5) | 6-12-nylon-1 | 10/90 | 19.1 | 8.5 | $1.0 \times 10^{-11}$ | 27 | 3 | $<-30$ |
| Comp. Exam. 5 | — | 6-12-nylon-1 | — | 1.0 | — | $2.5 \times 10^{-11}$ | 220 | 3 | $<-30$ |
| Comp. Exam. 6 | — | 6-12-nylon-1 | — | 8.0 | — | $2.3 \times 10^{-11}$ | 200 | 3 | $<-30$ |
| Comp. Exam. 7 | — | 6-12-nylon-1 | — | 14.4 | — | $2.3 \times 10^{-11}$ | 200 | 3 | $<-30$ |
| Comp. Exam. 8 | VD/VC (80/20) | — | — | 1.0 | — | $6.9 \times 10^{-13}$ | 2 | 3 | 15 |
| Comp. Exam. 9 | VD/VC (80/20) | — | — | 8.0 | — | $6.9 \times 10^{-13}$ | 2 | 3 | 15 |

EXAMPLE 24

6-12-nylon (copolymer of nylon 6 and nylon 12 of the copolymerization ratio of 50/50 by weight, made by EMS CHEMI AG company, Grilon CA (6) showing the crystalline melting point of 130° C and a glass transition temperature of 30° C (hereinafter referred to as 6-12-nylon-3) and a vinylidene chloride-methyl acrylate copolymer (content of vinylidene chloride of 95% by weight) were mixed at a weight ratio of 80/20, and the thus prepared mixture was melt-extruded at a resin temperature of 175° C by a kneading extruder provided with a circular die (40 mm in diameter and L/D of 24). The thus extruded material was rapidly chilled by water at 15° C to obtain a tubular parison. After heating the tubular parison in water at 50° C, air was introduced into the parison and the parison was inflation-stretched by the air pressure 3 times in the widthwise direction and 4 times in the lengthwise direction to obtain a stretched film of 100 mm in flattened width and 30 μm in thickness.

Inflation-stretching stability and the state of occurrence of the decomposed material of brown to black in colour (larger than 0.25 mm²) were investigated. The results are shown in Table 3. Moreover, the oxygen-permeability coefficient and the brittle temperature of the thus obtained film were determined, and the results are also shown in Table 3.

The mixture of the polyamide resin and PVDC of the present invention showed a stabilized inflation stretchability, and the occurrence of the decomposed product of PVDC was prevented. Moreover, the mixture fulfilled the gas-barrier property and the impact strength at low temperature at the same time.

COMPARATIVE EXAMPLE 10 AND 11

6-12-nylon-3 (Grilon CA 6) as the polyamide and a vinylidene chloride-methyl acrylate copolymer (Content of vinylidene chloride of 95% by weight) as PVDC were respectively used to obtain 2 kinds of the stretched films in the same method as in Example 14. The results of investigation of the inflation stretching stability and the occurrence of the decomposed material of brown to black in colour at the time of producing the film are shown in Table 3.

The polyamide film of Comparative Example 10 was high in the oxygen permeability coefficient, and the PVDC film of Comparative Example 11 was poor in extruding processability and poor in the impact strength at low temperature.

TABLE 3

| | PVDC (A) (ratio of copolymerization) | Polyamide (B) | Blending ratio (A/B) by weight | Area stretch ratio | Flatness of the dispersed particle | Extrusion processability*1 Decomposition stability | Extrusion processability*1 Inflation stretch stability | Oxygen-permeability coefficient cc·cm/cm²·sec·cmHg | Water vapor transmission rate g/m²·day | Brittle temperature °C |
|---|---|---|---|---|---|---|---|---|---|---|
| Exam. 24 | VD/MA (95/5) | 6-12-nylon-3 | 20/80 | 12 | (8.0) | O | O | $6.8 \times 10^{-12}$ | 25 | $<-30$ |
| Comp. exam. 10 | — | 6-12-nylon-3 | — | 12 | — | O | O | $2.3 \times 10^{-11}$ | 200 | $<-30$ |
| Comp. | VD/MA (95/5) | — | — | 12 | — | X | X | $6.9 \times 10^{-13}$ | 2 | 23 |

TABLE 3-continued

| PVDC (A) (ratio of copolymerization) | Polyamide (B) | Blending ratio (A/B) by weight | Area stretch ratio | Flatness of the dispersed particle | Extrusion processability[1] Decomposition stability | Inflation stretch stability | Oxygen-permeability coefficient cc · cm/cm$^2$ · sec · cmHg | Water vapor transmission rate g/m$^2$ · day | Brittle temperature °C |
|---|---|---|---|---|---|---|---|---|---|
| exam. 11 | | | | | | | | | |

[1]Evaluation of the extrusion processability:
Number of the decomposed material of brown to black in color of the size of larger than 0.25 mm$^2$ per 10 m in length
Less than 10: O
Between 10 to 50: Δ
More than 50: X
Evaluation of the inflation stretching stability:
Possible to continuously stretch for more than 30 minutes: O
Impossible to continuously stretch due to the breakage of the bubble in less than 15 minutes: X

EXAMPLES 25 AND 26

Polyamide resin of low melting temperature (Amilan CM 4000) and a vinylidene chloride-vinyl chloride copolymer (Content of vinylidene chloride of 80% by weight) were mixed at a ratio of 80/20 and 60/40 by weight respectively and the thus mixed resin was melt-extruded at the resin temperature of 170° C by a kneading extruder provided with a circular die. The thus extruded material was rapidly chilled by water at 15° C to prepare a tubular parison. After contact-heating the parison by a heating roll at 50° C, air was introduced into the parison to inflation-stretch the parison both in widthwise direction and lengthwise direction at 2.5/2.5 times, thereby obtaining a stretched film of 30 μm in thickness. Oxygen-permeability coefficient, water vapor transmission rate and brittle temperature of the film were determined, and the results were shown in Table 4.

It is understood that the stretched film consisting of the resin composition of the present invention are provided with both the excellent gas-barrier property and the lower value of brittle temperature at the same time.

TABLE 4

| | PVDC (A) (ratio of copolymerization) | Polyamide resin (B) | Blending ratio (A/B) by weight | Area stretch ratio | Flatness of the dispersed particle | Oxygen-permeability coefficient cc · cm/cm$^2$ · sec · cmHg | Water vapor transmission rate g/m$^2$ · day | Haze % | Brittle temperature °C. |
|---|---|---|---|---|---|---|---|---|---|
| Exam. 25 | VD/VC (80/20) | 6-66-610 nylon | 20/80 | 6.3 | 5.7 | $6.8 \times 10^{-12}$ | 38 | 30 | $<-30$ |
| Exam. 26 | VD/VC (80/20) | 6-66-610 nylon | 40/60 | 6.3 | 6.0 | $5.0 \times 10^{-12}$ | 20 | 32 | $<-30$ |

What is claimed is:

1. A stretched molded product having at least one layer comprising a resin composition consisting essentially of more than 40% by weight and not more than 95% by weight of polyamide resin having a low crystalline melting point of not higher than 210° C and less than 60% by weight and not less than 5% by weight of vinylidene chloride resin particles dispersed in said layer, the dispersed particles of vinylidene chloride resin in said stretched layer having a long, flat shape along at least one of the stretched directions, and the flatness, calculated as the long axis of the cross section of the dispersed particle divided by the short axis of the cross section of the dispersed particles, being not less than 2.

2. The stretched molded product according to claim 1, wherein the oxygen permeability coefficient of said layer is not more than $1.5 \times 10^{-11}$ cc.cm/cm$^2$.sec.cmHg at 30° C and 100% RH.

3. The stretched molded product according to claim 1, wherein the haze of said molded product, measured at a thickness of 30 μm, is not more than 40%.

4. The stretched molded product according to claim 1, which is a film, sheet or container.

5. The stretched molded product according to claim 1, wherein the brittle temperature of a film is not higher than 10°C.

* * * * *